(12) United States Patent
Campbell et al.

(10) Patent No.: US 10,582,152 B2
(45) Date of Patent: Mar. 3, 2020

(54) DYNAMIC DIRECTION CONTROL IN ACTIVE CABLE

(71) Applicant: TEXAS INSTRUMENTS INCORPORATED, Dallas, TX (US)

(72) Inventors: Charles Michael Campbell, Wylie, TX (US); Anwar Sadat, Richardson, TX (US); Mark Edward Wentroble, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/890,930

(22) Filed: Feb. 7, 2018

(65) Prior Publication Data

US 2019/0208163 A1    Jul. 4, 2019

Related U.S. Application Data

(60) Provisional application No. 62/611,020, filed on Dec. 28, 2017.

(51) Int. Cl.
| G06F 7/00 | (2006.01) |
| H04N 7/10 | (2006.01) |
| G06F 13/40 | (2006.01) |
| H04N 5/04 | (2006.01) |
| G06F 13/42 | (2006.01) |
| G09G 5/00 | (2006.01) |
| H04N 21/436 | (2011.01) |

(52) U.S. Cl.
CPC ......... *H04N 7/108* (2013.01); *G06F 13/4068* (2013.01); *G06F 13/4265* (2013.01); *G09G 5/00* (2013.01); *G09G 5/006* (2013.01); *H04N 5/04* (2013.01); *H04N 7/102* (2013.01); *H04N 21/436* (2013.01); *G06F 2213/0042* (2013.01); *G09G 2370/12* (2013.01)

(58) Field of Classification Search
CPC . H04N 7/08; H04N 5/04; H04N 7/102; G06F 13/4022; G06F 13/4068; G06F 13/4265; G06F 2213/0042; G06F 7/00; G06F 17/00; G06F 19/00
USPC ..................... 710/61, 14; 348/473
See application file for complete search history.

(56) References Cited

U.S. PATENT DOCUMENTS

| 8,176,214 B2 * | 5/2012 | Jones ................. G06F 13/409 710/14 |
| 2017/0139871 A1 * | 5/2017 | Yeh .................... G06F 13/4022 |
| 2018/0060270 A1 * | 3/2018 | Schnell .............. G06F 13/4282 |
| 2018/0143916 A1 * | 5/2018 | Gupta ................. G06F 13/102 |

* cited by examiner

*Primary Examiner* — Trang U Tran
(74) *Attorney, Agent, or Firm* — John R. Pessetto; Charles A. Brill; Frank D. Cimino

(57) ABSTRACT

A system includes a downstream facing port (DFP) coupled to a video source, an upstream facing port (UFP) coupled to a video sink, and a cable. The cable includes a first end that is connected to the DFP and a second end that is connected to the UFP. The cable is configured to carry a differential auxiliary transmission signal and detect polarity in the differential auxiliary transmission signal.

7 Claims, 3 Drawing Sheets

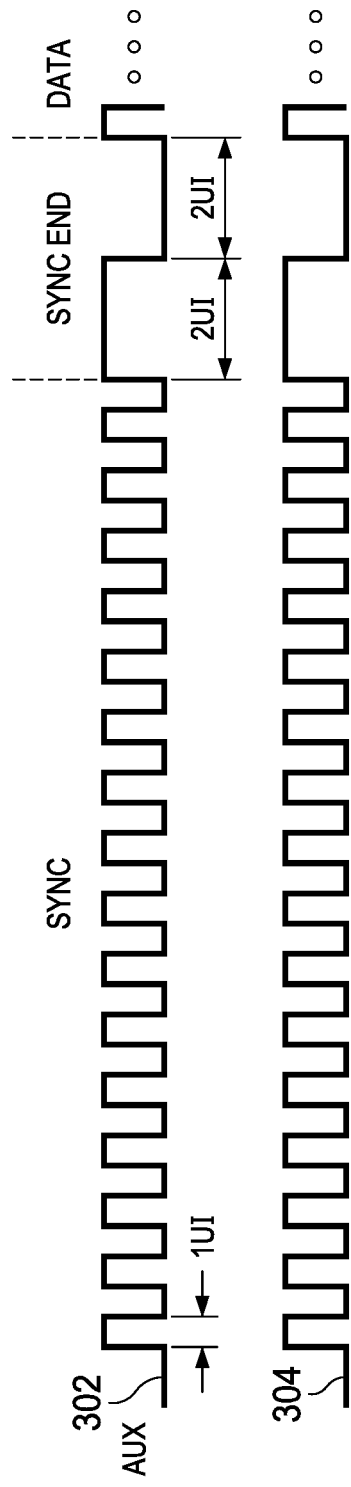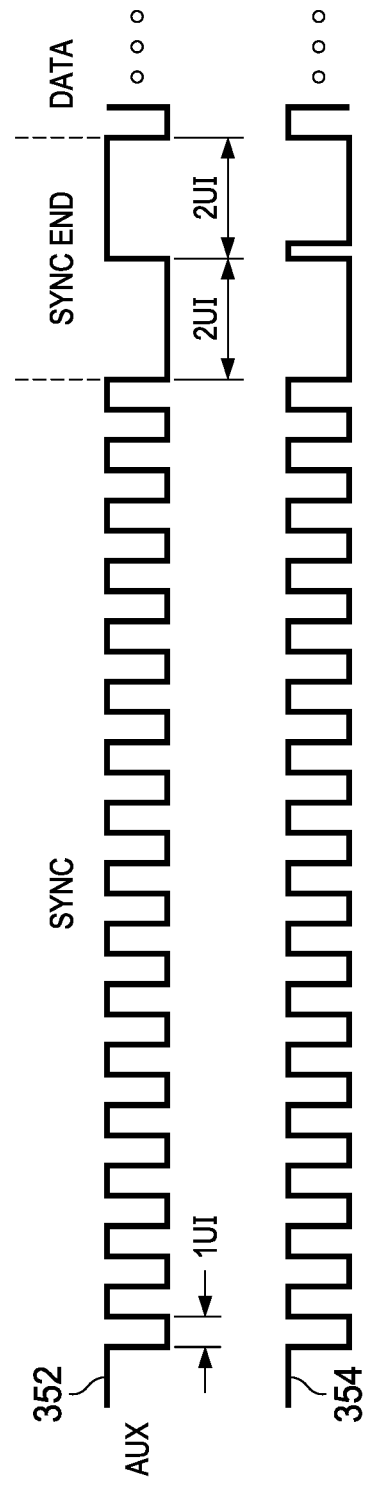

DYNAMIC DIRECTION CONTROL IN ACTIVE CABLE

CROSS-REFERENCE TO RELATED APPLICATIONS

The present application claims priority to U.S. Provisional Patent Application No. 62/611,020, filed Dec. 28, 2017, titled "Dynamic Polarity and Direction Control in Active Cable," which is hereby incorporated herein by reference in its entirety.

BACKGROUND

USB Type-C is a connector system that includes a rotationally-symmetrical connector. Therefore, standard passive USB Type-C cables may be connected, such that either end of the cable connects to a source while the other end connects to a sink (e.g., the cable is flipably and reversibly connectable to devices). Multiple protocols (e.g., USB and DisplayPort) can be sent over the same passive cable regardless of how the cable is connected because the physical wires in the cable connect one Type-C plug to the other Type-C plug. However, an active Type-C cable (one that includes a signal conditioning circuit at one or both ends of the cable) that supports multiple protocols (e.g., transmission of USB and DisplayPort transmissions over the same cable) cannot support any cable connection without a mechanism to detect which end of the cable is connected to the source and which end of the cable is connected to the sink.

SUMMARY

In accordance with at least one aspect of the disclosure, a cable includes a first wire, a second wire, a first signal conditioning circuit at a first end of the cable, and a polarity detection circuit. The first wire is configured to carry a first auxiliary transmission signal. The first wire is also configured to couple with a first sideband use pin at the first end of the cable and a second sideband use pin at a second end of the cable. The second wire is configured to carry a second auxiliary transmission signal. The second wire is also configured to couple with a third sideband use pin at the first end of the cable and a fourth sideband use pin at the second end of the cable. The first sideband use pin corresponds with the fourth sideband use pin. The second sideband use pin corresponds with the third sideband use pin. The first and second auxiliary transmission signals comprise a differential auxiliary transmission signal. The polarity detection circuit is coupled to the first signal conditioning circuit. The polarity detection circuit is configured to detect polarity in the differential auxiliary transmission signal.

Another illustrative aspect of the disclosure is a system that includes a downstream facing port (DFP) coupled to a video source, an upstream facing port (UFP) coupled to a video sink, and a cable. The cable includes a first end that is connected to the DFP and a second end that is connected to the UFP. The cable is configured to carry a differential auxiliary transmission signal and detect polarity in the differential auxiliary transmission signal.

Yet another illustrative aspect of the disclosure is a method of detecting polarity in an auxiliary transmission signal. The method includes receiving the auxiliary transmission signal. The auxiliary transmission signal includes a synchronization signal (SYNC) and an end of synchronization signal (SYNC End). The method also includes determining whether a start of the SYNC End signal is two consecutive HIGH unit intervals or two consecutive LOW unit intervals. The method also includes, in response to a determination that the start of the SYNC End signal is two consecutive HIGH unit intervals, determining that the auxiliary transmission signal is non-inverted. The method also includes, in response to a determination that the start of the SYNC End signal is two consecutive LOW unit intervals, determining that the auxiliary transmission signal is inverted.

BRIEF DESCRIPTION OF THE DRAWINGS

For a detailed description of various examples, reference will now be made to the accompanying drawings in which:

FIG. 3A shows an illustrative non-inverted transmission signal in accordance with various examples;

FIG. 3B shows an illustrative inverted transmission signal and corrected non-inverted transmission signal in accordance with various examples.

NOTATION AND NOMENCLATURE

Figure 1:
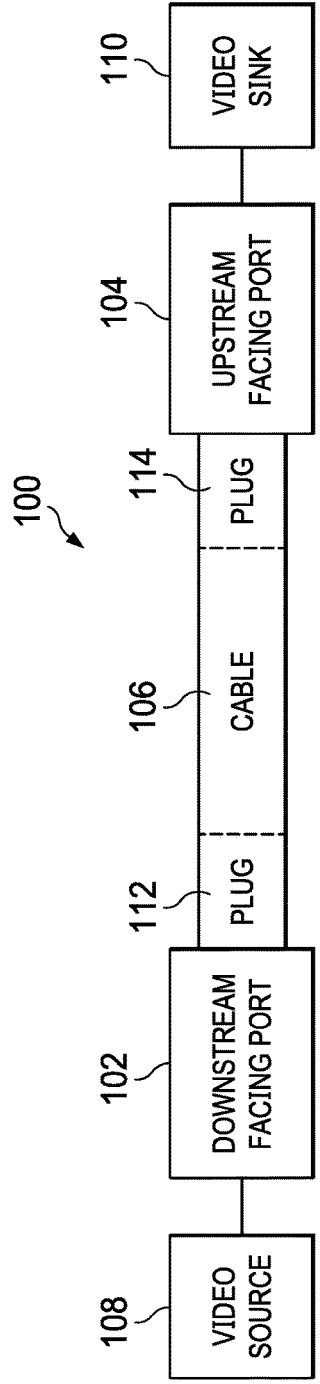
FIG. 1 shows an illustrative block diagram of a video display system in accordance with various examples.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

DETAILED DESCRIPTION

The following discussion is directed to various examples of the disclosure. Although one or more of these examples may be preferred, the examples disclosed should not be interpreted, or otherwise used, as limiting the scope of the disclosure, including the claims. In addition, one skilled in the art will understand that the following description has broad application, and the discussion of any example is meant only to be exemplary of that example, and not intended to intimate that the scope of the disclosure, including the claims, is limited to that example.

USB Type-C connectors are rotationally-symmetrical. Therefore, standard USB Type-C cables may be connected, such that either end of the cable connects to a source while the other end connects to a sink (e.g., the cable is flipably and reversibly connectable to devices). Multiple protocols (e.g., USB and DisplayPort) can be sent over the same passive cable regardless of how the cable is connected because the physical wires in the cable connect one Type-C plug to the other Type-C plug. However, an active Type-C cable (one that includes a signal conditioning circuit at one or both ends of the cable) that supports multiple protocols (e.g., transmission of USB and DisplayPort transmissions over the same cable) cannot support any cable connection without a mechanism to detect which end of the cable is connected to the source and which end of the cable is connected to the sink in order to properly decode transmissions.

USB Type-C cables can include two power delivery controllers which can be utilized to indicate which of the two connectors of the cable is connected to the downstream facing port and which connector of the cable is connected to the upstream facing port. For example, one power delivery controller is located at one end of the cable while the second power delivery controller is located at the opposite end of the cable. The power delivery controller located closest to the downstream facing port is configured to respond to a start of packet prime (SOP') message. The power delivery controller located closest to the upstream facing port is configured to respond to a start of packet double prime (SOP") message. In other words, a message sent along the configuration channel (CC wire) intended for the power delivery controller located closest to the downstream facing port utilizes a SOP' protocol while a message intended for the power delivery controller located closest to the upstream facing port utilizes a SOP" protocol. Once a power delivery controller determines that it is closest to the downstream facing port or the upstream facing port, it configures a signal conditioning circuit to the appropriate configuration so that signals can be properly decoded. However, a power delivery controller increases cost and complexity. Therefore, it is desirable to develop a system that is capable of determining which of the two connectors of the cable is connected to the downstream facing port and which is connected to the upstream facing port without a power delivery controller.

In accordance with various examples, a cable, in some examples a USB Type-C cable, is provided that is capable of determining the orientation of the connectors (e.g., which connector is connected to the downstream facing port and which connector is connected to the upstream facing port) without a power delivery controller. The cable includes one or more polarity detection circuits that are configured to detect the polarity of an auxiliary transmission signal passing through the cable based on a synchronization end signal within the auxiliary transmission signal. In response to a determination that the synchronization end signal begins with two consecutive HIGH unit intervals, the polarity detection circuits determine that the auxiliary transmission signal is non-inverted. Thus, the signal conditioning circuit at the signal receiving end of the signal passes the auxiliary transmission signal. However, in response to a determination that the synchronization end signal begins with two consecutive LOW unit intervals, the polarity detection circuits determine that the auxiliary transmission signal is inverted. Thus, to correct the inversion so that data may be decoded, the signal conditioning circuit at the signal receiving end of the signal inverts the auxiliary transmission signal to generate a corrected non-inverted auxiliary transmission signal capable of being decoded. In this way, the cable is capable of decoding signals without utilizing a power delivery controller to determine which end of the cable is connected to the downstream facing port and which end of the cable is connected to the upstream facing port.

FIG. 1 shows an illustrative block diagram of a video display system 100 in accordance with various examples. The video display system 100 includes, in an example, a downstream facing port (DFP) 102, an upstream facing port (UFP) 104, a cable 106, a video source 108, and a video sink 110. The DFP 102 can be coupled to the video source 108, and the UFP 104 can be coupled to the video sink 110. In some examples, the video source 108 is a graphics processing unit (GPU) which is designed to process data for rendering images that may be displayed by the video sink 110. Therefore, in some examples, the video sink 110 is a video display device (e.g., a monitor, a television, etc.). In order to display the data processed by the video source 108, the data is transmitted via the cable 106 from the video source 108 to the video sink 110. Thus, the DFP 102 is configured to couple a first end of the cable 106, via plug 112, to the video source 108, and the UFP 104 is configured to couple a second end of the cable 106, via plug 114, to the video sink 110.

In some examples, the cable 106 is an active cable (e.g., a cable that includes circuitry to boost performance), and more particularly, an active Type-C USB cable. In some examples, the cable 106 is configured to carry traffic (e.g., data) in multiple protocols. For example, cable 106 can, in some examples, carry traffic utilizing the USB protocol and traffic utilizing the DisplayPort protocol. Therefore, the data transmitted by the video source 108 to the video sink 110 can be transmitted utilizing the DisplayPort protocol; however, other data may be transmitted between the DFP 102 and the UFP 104 utilizing the USB protocol. In some examples, the cable 106 can carry traffic in multiple protocols simultaneously. The plugs 112-114 can be symmetrical such that the plugs 112-114 are flipable and reversible. For example, the plug 112 can be configured such that it can be connected to the DFP 112 or the UFP 104 in any orientation. Similarly, the plug 114 can be configured such that it can be connected to the UFP 104 or the DFP 102 in any orientation. Thus, data can be transferred between the DFP 102 to the UFP 104 no matter which plug 112 or 114 is connected to the DFP 102 and no matter which plug 112 or 114 is connected to the UFP 104.

Figure 2:
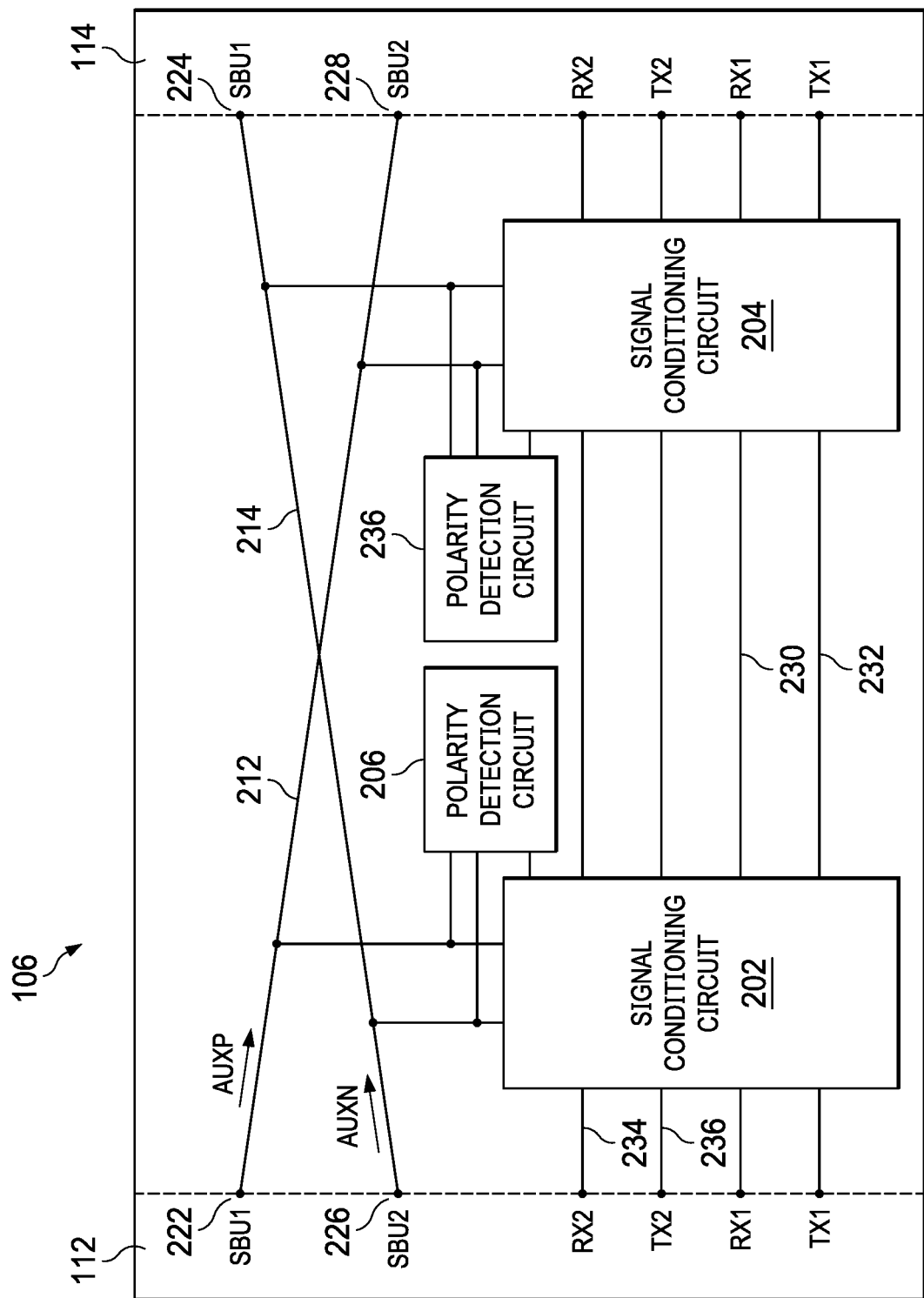
FIG. 2 shows an illustrative block diagram of a cable included in a video display system in accordance with various examples.

FIG. 2 shows an illustrative block diagram of cable 106 included in the video display system 100 in accordance with various examples. The cable 106 includes, in an example, signal conditioning circuits 202-204, polarity detection circuits 206 and 236, and various pins (e.g., sideband use 1 (SBU 1) pins 222-224, sideband use 2 (SBU 2) pins 226-228, transmitter pins (TX) pins, and receiver pins (RX) pins). The pins are configured to connect to corresponding pins in the DFP 102 or UFP 104. For example, the SBU 1 pin 222 can connect to an SBU 1 pin in the DFP 102 through the plug 112, and the SBU 1 pin 224 can connect to an SBU 1 pin in the UFP 104 through the plug 114 at the opposite end of the cable 106. Similarly, the SBU 2 pin 226 can connect to an SBU 2 pin in the DFP 102 through the plug 112, and the SBU 2 pin 228 can connect to an SBU 2 pin in the UFP 104 through the plug 114. Thus, the SBU 1 pin 222 corresponds with the SBU 1 pin 224 (they are both SBU 1 pins), and the SBU 2 pin 226 corresponds with the SBU 2 pin 228 (they are both SBU 2 pins). Additionally, the SBU 1 pin 222 is coupled to the SBU 2 pin 228, and the SBU 2 pin 226 is coupled to the SBU 1 pin 224.

In some examples, the SBU 1 pin 222 and the SBU 2 pin 226 are configured to receive a differential auxiliary transmission signal composed of a positive auxiliary transmission signal (AUXP) and a negative auxiliary transmission signal (AUXN) that are a differential pair of signals. More particularly, the SBU 1 pin 222 is configured to receive the AUXP signal from the DFP 102, and the SBU 2 pin 226 is configured to receive the AUXN signal from the DFP 102. The wire 212 is configured to carry the AUXP signal to the SBU 2 pin 228 where the AUXP signal then is received by the UFP 104. Similarly, the wire 214 is configured to carry the AUXN signal to the SBU 1 pin 224 where the AUXN signal then is received by the UFP 104. The differential auxiliary transmission signal, in some examples, includes data transmitted between the video source 108 and the video sink 110. For example, the differential auxiliary transmission signal can include video sink 110 panel information (e.g., resolution, the type of monitor, etc.), number of DisplayPort lanes for transmitting DisplayPort traffic, the data rate of the DisplayPort traffic, etc.

Each differential auxiliary transmission signal comprises, in some examples, a synchronization (SYNC) signal, a synchronization end (SYNC End) signal, and data. In an example, the SYNC signal provides an indication that data is about to be transmitted. Therefore, the SYNC signal begins each differential auxiliary transmission signal with a Manchester Encoded pattern of a number (e.g., 16) of consecutive signals, each consisting of a single HIGH unit interval (pulse time and/or symbol duration time) followed by a single LOW unit interval. To indicate that the SYNC signal is complete and data is about to begin, the SYNC End signal follows the SYNC signal with a non-valid Manchester Encoded signal that includes, in an example, two consecutive HIGH unit intervals followed by two consecutive LOW unit intervals. Following the SYNC End signal, data transmission commences in the differential auxiliary transmission signal.

The wires 230-236 connect the TX pins and RX pins at each end of the cable 106. In some examples, DisplayPort lane data (e.g., streaming video data) is transmitted through the wires 230-236. For example, DisplayPort lane 3 traffic can be received by the TX 1 pin in the plug 112 from the video source 108 via the DFP 102. The wire 232 then carries the lane 3 traffic to the TX 1 pin in the plug 114 to be received by the video sink 110 via the UFP 104.

The signal conditioning circuits 202-204 are provided at opposite ends of the cable 106. For example, signal conditioning circuit 202 can be positioned at the same end of the cable 106 as the plug 112, and the signal conditioning circuit 204 can be positioned at the same end of the cable 106 as the plug 114. The signal conditioning circuits 202-204, are connected to the wires 212-214 and 230-236 and thus can receive the differential auxiliary transmission signal and the data signals carried by wires 230-236 (e.g., DisplayPort lane data). The signal conditioning circuits 202-204 are, in an example, redrivers and switches (hardware) configured to provide compensation for input channel loss in the received signals. In some examples, the signal conditioning circuits 202-204 also are configured to equalize the compensated signals to reduce jitter in the signals. While two signal conditioning circuits are shown in FIG. 2, in some examples, only one signal conditioning circuit is provided in cable 106.

Because the cable 106 is reversible, the plugs 112-114 of the cable 106 can be plugged into either the DFP 102 or the UFP 104. Therefore, depending on the orientation of the cable 106, the data signals being carried by the wires 212-214 and 230-236 can be non-inverted or inverted. If the data signals are inverted, then the data being carried may not be able to be decoded. The polarity detection circuit 206 is connected to the signal conditioning circuit 202 and polarity detection circuit 236 is connected to the signal conditioning circuit 204. In some examples, the polarity detection circuit 206 is a part of the signal conditioning circuit 202 and the polarity detection circuit 236 is a part of the signal conditioning circuit 204. The polarity detection circuits 206 and/or 236 is configured to detect the polarity in the differential auxiliary transmission signal that is carried as AUXP and AUXN through wires 212-214. In an example, the polarity detection circuits 206 and/or 236 monitor the SYNC End signal (part of the differential auxiliary transmission signal) to determine whether the differential auxiliary transmission signal is inverted. If the SYNC End signal begins (e.g., the first two unit intervals) with two consecutive HIGH unit intervals, then the differential auxiliary transmission signal is non-inverted. Additionally, if the last two unit intervals are two consecutive LOW unit intervals, then the differential auxiliary transmission is non-inverted. However, if the SYNC End signal begins (e.g., the first two unit intervals) with two consecutive LOW unit intervals, then the differential auxiliary transmission signal is inverted, and if the last two unit intervals are two consecutive HIGH unit intervals, the differential auxiliary transmission is inverted.

If the polarity detection circuits 206 and/or 236 determines that the differential auxiliary system is inverted, the signal conditioning circuit 202 and/or the signal conditioning circuit 204 is configured to invert the differential auxiliary transmission signal to generate a corrected non-inverted differential auxiliary transmission signal which can be decoded. If the polarity detection circuits 206 and/or 236 determines that the differential auxiliary system is non-inverted, the signal conditioning circuit 202 and/or the signal conditioning circuit 204 is configured to pass the differential auxiliary signal without inverting the differential auxiliary signal. Additionally, the signal conditioning circuit 202 and/or the signal conditioning circuit 204 can set the RX and TX channels in the appropriate direction based on the determination of whether the differential auxiliary system is inverted or non-inverted. For example, if the differential auxiliary signal is non-inverted, then a determination can be made that the plug 112 is connected to DFP 102; however, if the differential auxiliary signal is inverted, then a determination can be made that the plug 112 is connected to the UFP 104. Based on this determination, the signal conditioning circuit 202 and/or the signal conditioning circuit 204 can configure the RX and TX channels at each end of the cable 106. In this way, the cable 106 can determine which end of the cable 106 is connected to the DFP 102 and which end is connected to the UFP 104 and configure the signal and/or channels accordingly without the need for a PD controller. Because a PD controller is not needed, cost and complexity in the cable is reduced.

In some examples, when two signal conditioning circuits are provided (e.g., signal conditioning circuits 202 and 204), the polarity detection circuit that detects a polarity inversion is connected to the UFP (e.g., polarity detection circuit 204). The signal conditioning circuit with the polarity detection circuit which does not detect a polarity inversion is connected to the DFP (e.g., signal detection circuit 202). Thus, in this example, if two signal conditions and two polarity detection circuits are present in cable 106, one signal conditioning circuit/polarity detection circuit can always detect a polarity inversion and is connected to the UFP. The other signal conditioning circuit will not detect a polarity inversion and is connected to the DFP.

FIG. 3A shows an illustrative non-inverted auxiliary transmission signal 302 in accordance with various examples. As discussed above, the non-inverted auxiliary transmission signal 302 (e.g., a differential auxiliary transmission signal) begins with a valid Manchester Encoded SYNC signal pattern. Therefore, each HIGH signal and each LOW signal is a single unit interval. Once the given number of pulses (e.g., 16) have passed the SYNC End signal is transmitted. The SYNC End signal is, in an example, two consecutive HIGH unit intervals followed by two consecutive LOW unit intervals. As shown, in FIG. 3A, the auxiliary transmission signal 302 has a SYNC End signal that has two consecutive HIGH unit intervals followed by two consecutive LOW unit intervals. Therefore, the auxiliary transmission signal 302 is non-inverted and the signal is passed as auxiliary transmission signal 304 through the cable 106 without inverting.

FIG. 3B shows an illustrative inverted transmission signal 352 and corrected non-inverted transmission signal 354 which is within the signal conditioning circuit 202 and/or 204 but is never corrected as sent across the wire in accordance with various examples. As discussed above, the auxiliary transmission signal 352 (e.g., a differential auxiliary transmission signal) begins with a valid Manchester Encoded SYNC signal pattern. Therefore, each HIGH signal and each LOW signal is a single unit interval. Once the given number of pulses (e.g., 16) have passed the SYNC End signal is transmitted. The SYNC End signal is, in an example, two consecutive HIGH unit intervals followed by two consecutive LOW unit intervals. However, as shown, in FIG. 3B, the auxiliary transmission signal 352 has a SYNC End signal that has two consecutive LOW unit intervals followed by two consecutive HIGH unit intervals. Therefore, the auxiliary transmission signal 352 is inverted. Hence, the signal conditioning circuit 202 and/or the signal conditioning circuit 204 is configured to invert the auxiliary transmission signal 354 to generate the corrected non-inverted transmission signal 354 which is then passed through the cable 106.

Because the SYNC End signal is not a valid Manchester Encoded signal, it is possible for the polarity detection circuit 206 to detect that the auxiliary transmission signal 352 is inverted as soon as two consecutive LOW unit intervals are detected as the beginning of the SYNC End signal. Therefore, the signal conditioning circuit 202 and/or the signal conditioning circuit 204 is configured, in an example, to invert the auxiliary transmission signal 352 as soon the polarity detection circuit 206 detects two consecutive LOW unit intervals at the beginning of the SYNC End signal as shown in FIG. 3B. The signal conditioning circuit 202 and/or the signal conditioning circuit 204 can be configured to maintain the inversion of the auxiliary transmission signal 352 or any subsequent auxiliary transmission signal until the polarity detection circuit 206 detects two consecutive HIGH unit intervals at the beginning of a SYNC End signal.

Figure 4:
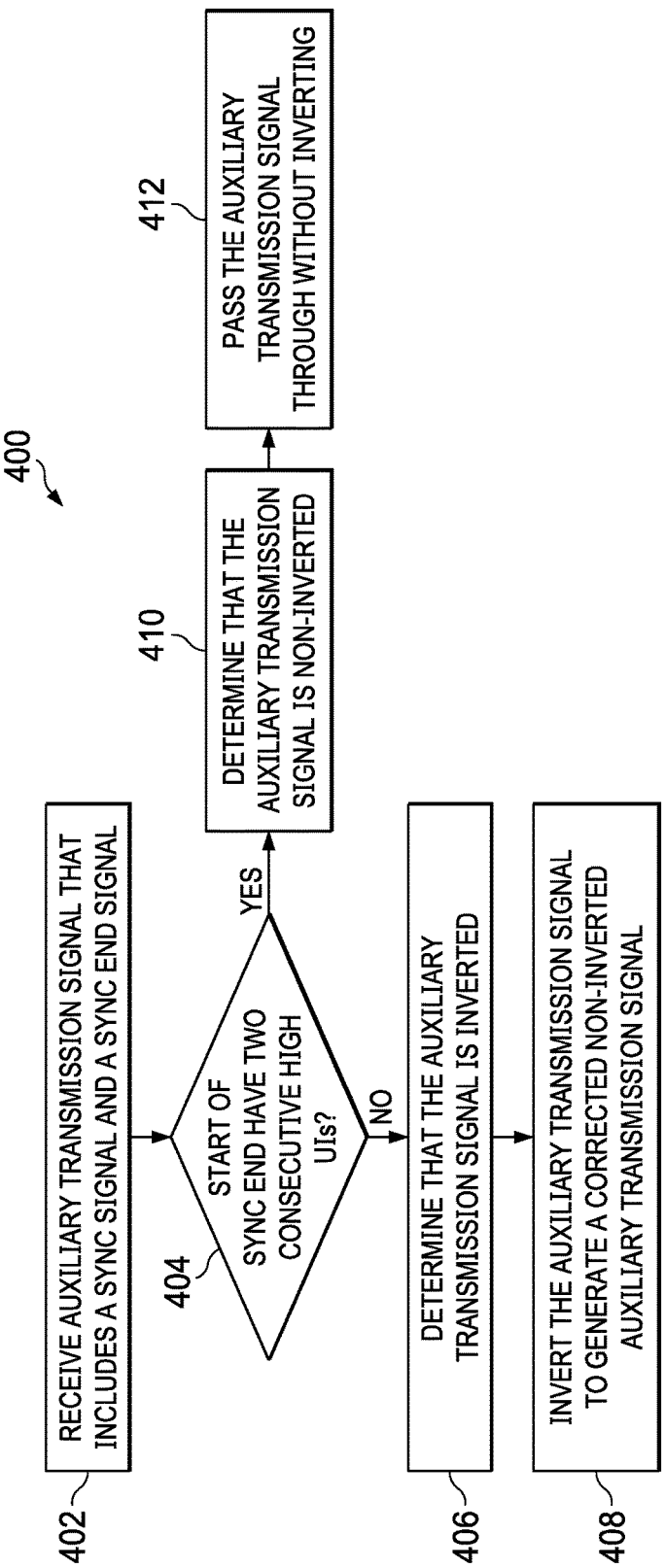
FIG. 4 shows an illustrative flow diagram of a method of detecting polarity in an auxiliary transmission signal in accordance with various examples.

FIG. 4 shows an illustrative flow diagram of a method 400 of detecting polarity in an auxiliary transmission signal in accordance with various examples. Though depicted sequentially as a matter of convenience, at least some of the actions shown can be performed in a different order and/or performed in parallel. Additionally, some examples may perform only some of the actions shown. In some examples, at least some of the operations of the method 400, as well as other operations described herein, are performed by the video source 108, the DFP 102, the UFP 104, the video sink 110, and/or the cable 106 (including the plugs 112-114, the wires 212-214 and/or 230-236, the pins 222-228, the signal conditioning circuits 202-204, and/or polarity detection circuits 206 and/or 236) and implemented in logic.

The method 400 begins in block 402 with receiving an auxiliary transmission signal that includes a SYNC signal and a SYNC End signal. For example, the cable 106 at SBU 1 pin 222 and SBU 2 pin 226 can receive an auxiliary transmission signal comprised of AUXP and AUXN from the video source 108 via the DFP 102. In block 404, the method 400 continues with determining whether the start of the SYNC End signal has two consecutive HIGH unit intervals or two consecutive LOW unit intervals. For example, the polarity detection circuit 206 can determine whether the SYNC End signal in the auxiliary transmission signal begins with two consecutive HIGH unit intervals or if the SYNC End signal begins with two consecutive LOW unit intervals.

If, in block 404, a determination is made that the SYNC End signal starts with two consecutive HIGH unit intervals, the method 400 continues in block 410 with determining that the auxiliary transmission signal is non-inverted. For example, in response to the polarity detection circuit 206 determining that the start of the SYNC End signal has two consecutive HIGH unit intervals, the polarity detection circuits 206 and/or 236 determines that the auxiliary transmission signal is non-inverted. In block 412, the method 400 continues with passing the auxiliary transmission signal through without inverting. For example, the signal conditioning circuit 202 and/or the signal conditioning circuit 204 can pass the auxiliary transmission signal without inverting it.

However, if, in block 404, a determination is made that the SYNC End signal starts with two consecutive LOW unit intervals, the method 400 continues in block 406 with determining that the auxiliary transmission signal is inverted. For example, in response to the polarity detection circuit 206 determining that the start of the SYNC End signal has two consecutive LOW unit intervals, the polarity detection circuits 206 and/or 236 determines that the auxiliary transmission signal is inverted. In block 408, the method 400 continues with inverting the auxiliary transmission signal to generate a corrected non-inverted auxiliary transmission signal. For example, the signal conditioning circuit 202 and/or the signal conditioning circuit 204 can invert the auxiliary transmission signal to generate the corrected non-inverted auxiliary transmission signal.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A system, comprising:
   a downstream facing port (DFP) coupled to a video source;
   an upstream facing port (UFP) coupled to a video sink; and
   a cable including a first end connected to the DFP and a second end connected to the UFP, the cable configured to:
      carry a differential auxiliary transmission signal, that includes:
         a synchronization signal (SYNC) and an end of synchronization signal (SYNC End),
         the SYNC End signal including a first non-valid code, followed by a second invalid code; and
      detect polarity of the differential auxiliary transmission signal:
         as non-inverted in response to a beginning of the SYNC End signal including the first non-valid code; or
         as inverted in response to the end of the SYNC End signal including the second non-valid code.

2. The system of claim 1, wherein the SYNC signal uses Manchester encoding, and the first non-valid code is two consecutive HIGH unit intervals.

3. The system of claim 1, wherein the SYNC signal uses Manchester encoding, and the second non-valid code is two consecutive LOW unit intervals.

4. The system of claim 1, wherein in response to the differential auxiliary transmission signal being detected as non-inverted, the cable is configured to pass the differential auxiliary signal through without inverting the differential auxiliary signal.

5. The system of claim 1, wherein, in response to the differential auxiliary transmission signal being detected as inverted, the cable is configured to invert the differential auxiliary transmission signal to generate a corrected non-inverted differential auxiliary transmission signal.

6. The system of claim 1, wherein the video sink is a video display device.

7. The system of claim 1, wherein the video source is a graphics processing unit (GPU).

* * * * *